US011898263B2

(12) United States Patent
Hirai et al.

(10) Patent No.: US 11,898,263 B2
(45) Date of Patent: Feb. 13, 2024

(54) PLATED PRODUCT AND METHOD FOR PRODUCING SAME

(71) Applicant: DOWA METALTECH CO., LTD., Tokyo (JP)

(72) Inventors: Yutaro Hirai, Tokyo (JP); Kentaro Arai, Tokyo (JP); Shunsuke Ashidate, Tokyo (JP)

(73) Assignee: DOWA METALTECH CO., LTD., Tokyo (JP)

( * ) Notice: Subject to any disclaimer, the term of this patent is extended or adjusted under 35 U.S.C. 154(b) by 0 days.

(21) Appl. No.: 17/435,746

(22) PCT Filed: Jan. 22, 2020

(86) PCT No.: PCT/JP2020/002032

§ 371 (c)(1),
(2) Date: Sep. 2, 2021

(87) PCT Pub. No.: WO2020/202718

PCT Pub. Date: Oct. 8, 2020

(65) Prior Publication Data

US 2022/0136122 A1 May 5, 2022

(30) Foreign Application Priority Data

Mar. 29, 2019 (JP) ................................ 2019-065248

(51) Int. Cl.
*C25D 3/12* (2006.01)
*C25D 3/30* (2006.01)
(Continued)

(52) U.S. Cl.
CPC ................ *C25D 3/12* (2013.01); *C25D 3/30* (2013.01); *C25D 3/46* (2013.01); *C25D 5/013* (2020.08);
(Continued)

(58) Field of Classification Search
CPC ..................................................... H01H 1/025
See application file for complete search history.

(56) References Cited

U.S. PATENT DOCUMENTS

2015/0171537 A1 6/2015 Shibuya et al.
2016/0348260 A1 12/2016 Takahashi

FOREIGN PATENT DOCUMENTS

CN 105185608 A * 12/2015 ............ H01H 1/025
DE 112017002082 T5 1/2019
(Continued)

OTHER PUBLICATIONS

Suzuki, Machine & Partial Human Translation, JP H09-078287 A (Year: 1997).*

(Continued)

*Primary Examiner* — Hosung Chung
(74) *Attorney, Agent, or Firm* — Bachman & LaPointe, P.C.

(57) ABSTRACT

There is provided an inexpensive plated product, which can prevent the increase of the contact resistance of a silver-plating film and the change of the color of the surface thereof after reflow-treating a plated product wherein the silver-plating film is formed on a portion of the surface thereof and wherein a tin-plating film is formed on a portion of the other portion of the surface thereof, and a method for producing the same. The plated product is produced by a method including the steps of: forming a nickel-plating film 12 on a surface of a base material 10 of copper or a copper alloy; forming a silver-plating film 16 on a portion of a surface of the nickel-plating film 12, and forming a tin-plating film 20 on a portion of the other portion of the surface of the nickel-plating film 12, to prepare a plated product which has the silver-plating film 16 and the tin-plating film 20 on the surface of the nickel-plating film 12 formed on the base material 10; and irradiating the surface of the plated product
(Continued)

with infrared rays to heat the surface thereof to reflow-treat the tin-plating film 20 to cause the tin-plating film 20 to be a reflowed tin-plating layer 22.

4 Claims, 6 Drawing Sheets

(51) Int. Cl.

| | |
|---|---|
| ***C25D 3/46*** | (2006.01) |
| ***C25D 5/02*** | (2006.01) |
| ***C25D 5/12*** | (2006.01) |
| ***C25D 5/50*** | (2006.01) |
| ***H01H 1/025*** | (2006.01) |
| ***C25D 5/00*** | (2006.01) |

(52) U.S. Cl.

CPC ............... *C25D 5/022* (2013.01); *C25D 5/12* (2013.01); *C25D 5/505* (2013.01); *C25D 5/625* (2020.08); *H01H 1/025* (2013.01)

(56) References Cited

FOREIGN PATENT DOCUMENTS

| | | | | |
|---|---|---|---|---|
| JP | 0978287 | A | | 3/1997 |
| JP | H09-078287 | A | * | 3/1997 |
| JP | 2925986 | B2 | | 7/1999 |
| JP | 2002134361 | A | | 5/2002 |
| JP | 2016166396 | A | | 9/2016 |
| WO | 2015092979 | A1 | | 6/2015 |
| WO | 2015092978 | A1 | | 3/2017 |

OTHER PUBLICATIONS

International search report for patent application No. PCT/JP2020/002032 dated Apr. 14, 2021.

Extended European Search Report dated Sep. 9, 2022 for corresponding application EP20784961.3.

* cited by examiner

PLATED PRODUCT AND METHOD FOR PRODUCING SAME

TECHNICAL FIELD

The present invention generally relates to a plated product and a method for producing the same. More specifically, the invention relates to a plated product used as the material of contact and terminal parts, such as connectors, switches and relays, which are used for on-vehicle and/or household electric wiring, and a method for producing the same.

BACKGROUND ART

As conventional materials of contact and terminal parts, such as connectors and switches, there are used plated products in each of which a base material of copper, a copper alloy, stainless steel or the like, which is relatively inexpensive and which has excellent corrosion resistance, mechanical characteristics and so forth, is plated with tin, silver, gold or the like in accordance with required characteristics, such as electrical and soldering characteristics. In order to improve the adhesion between the plating and the base material, there is also used a plated product having an underlying layer of nickel between the plating and the base material.

Tin-plated products obtained by plating a base material of copper, a copper alloy, stainless steel or the like with tin are inexpensive, but they do not have good corrosion resistance in a high-temperature environment. Gold-plated products obtained by plating such a base material with gold have excellent corrosion resistance and high reliability, but the costs thereof are high. On the other hand, silver-plated products obtained by plating such a base material with silver are inexpensive in comparison with gold-plated products and have excellent corrosion resistance in comparison with tin-plated products.

For that reason, as the material of terminal parts, such as connectors, there may be cases where there is used a plated product wherein the portions (fitted portions) of male and female terminals, in which the male terminal is fitted into the female terminal, are plated with gold or silver and wherein the portion (swaging or caulking portion) for swaging or caulking an electric wire or the like is coated with a dull or glossy tin-plating film which is inexpensive and which is easily deformed.

Tin plating is generally carried out by electroplating. After electroplating, a reflow treatment (a treatment for causing the tin-plating film to be solidified after being melted by heating) is generally carried out in order to buffer the internal stress in the tin-plating film to suppress the occurrence of whiskers. If the reflow treatment is thus carried out after tin plating, a portion of tin diffuses to the components of the base material and/or underlying layer to form a compound layer, and a tin or tin alloy layer is formed on the compound layer.

Particularly in a plated product wherein a portion for swaging or caulking an electric wire or the like of aluminum or an aluminum alloy is plated with tin, the resistance value thereof is high, so that it is required to carry out the reflow treatment after tin plating is carried out in order to suppress the increase of the resistance value thereof.

As such a plated product, there is known a plated product produced by a method comprising the steps of: forming an underlying layer of nickel on one side of a plate-shaped metal member of copper or a copper alloy by electroplating; forming a silver-plating layer on the underlying layer by electroplating; forming a tin-plating layer on the other side of the plate-shaped metal member directly by electroplating without forming any underlying layer; and carrying out a reflow treatment, which heats the tin-plating layer at 400 to 800° C. in an atmosphere of a low oxygen concentration of 200 ppm or less, to melt the tin-plating layer to form an intermetallic compound of tin and copper between the plate-shaped metal member and the tin-plating layer (see, e.g., Patent Document 1).

There is also known a plated product produced by a method comprising the steps of: completely peeling at least a portion of a reflowed tin-plating layer and reaction layer off from a metal base material wherein the reflowed tin-plating layer is formed on at least a portion thereof and wherein the reaction layer is formed on the interface between the reflowed tin-plating layer and the metal base material; nickel-plating at least a portion of a region, in which the reflowed tin-plating layer and the reaction layer are completely peeled off, to form a nickel-plating layer thereon; and tin plating at least a portion of the nickel-plating layer (see, e.g., Patent Document 2).

Prior Art Document(s)

Patent Document(s)

Patent Document 1: JP2002-134361A (Paragraph Number 0033)

Patent Document 2: WO2015/092979A (Paragraph Number 0011)

SUMMARY OF THE INVENTION

Problem to be Solved by the Invention

If the plated product used as the material of terminal parts, such as connectors, is a plated product which has a fitted portion plated with gold (having an excellent resistance to oxidation) and which has a swaged (or caulked) portion reflow-treated after being plated with tin, the contact resistance thereof is hardly increased after heating by the reflow treatment. However, if the plated product used as the material of terminal parts, such as connectors, is a plated product which has a fitted portion plated with silver (which is inexpensive in comparison with gold) and which has a swaged (or caulked) portion reflow-treated after being plated with tin, there are problems in that the contact resistance of the silver-plating film may be increased and/or the color of the surface of the silver-plating film may be changed, after heating by the reflow treatment.

In the method disclosed in Patent Document 1, it is required to provide a facility for heating in an atmosphere of a low oxygen concentration, so that the producing costs are increased. In addition, even if the reflow treatment is carried out in the atmosphere of the low oxygen concentration, there is some possibility that the contact resistance of the silver-plating film may be increased and/or that the color of the surface of the silver-plating film may be changed, since the heating is carried out at a high temperature in a state that the silver-plating layer and the tin-plating layer coexist.

In the method disclosed in Patent Document 2, it is required to carry out a process for completely peeling at least a portion of the reflowed tin-plating layer and reaction layer off, so that the producing costs are increased. In addition, there is some possibility that the reflowed tin-plating layer and the reaction layer may be peeled off more than necessary when they are dissolved in a chemical to be peeled off.

It is therefore an object of the present invention to eliminate the aforementioned conventional problems and to provide an inexpensive plated product, which can prevent the increase of the contact resistance of a silver-plating film and the change of the color of the surface thereof after reflow-treating a plated product wherein the silver-plating film is formed on a portion of the surface thereof and wherein a tin-plating film is formed on a portion of the other portion of the surface thereof, and a method for producing the same.

Means for Solving the Problem

In order to accomplish the aforementioned object, the inventors have diligently studied and found that it is possible to inexpensively produce a plated product, which can prevent the increase of the contact resistance of a silver-plating film and the change of the color of the surface thereof after reflow-treating the tin-plating film, if the plated product is produced by a method comprising the steps of: forming a nickel-plating film on a surface of a base material of copper or a copper alloy; forming a silver-plating film on a portion of a surface of the nickel-plating film, and forming a tin-plating film on a portion of the other portion of the surface of the nickel-plating film, to prepare a plated product which has the silver-plating film and the tin-plating film on the surface of the nickel-plating film formed on the base material; and irradiating the surface of the plated product with infrared rays to heat the surface thereof to reflow-treat the tin-plating film to cause the tin-plating film to be a reflowed tin-plating layer. Thus, the inventors have made the present invention.

According to the present invention, there is provided a method for producing a plated product, the method comprising the steps of: forming a nickel-plating film on a surface of a base material of copper or a copper alloy; forming a silver-plating film on a portion of a surface of the nickel-plating film, and forming a tin-plating film on a portion of the other portion of the surface of the nickel-plating film, to prepare a plated product which has the silver-plating film and the tin-plating film on the surface of the nickel-plating film formed on the base material; and irradiating the surface of the plated product with infrared rays to heat the surface thereof to reflow-treat the tin-plating film to cause the tin-plating film to be a reflowed tin-plating layer.

In this method, the plated product, which has the silver-plating film and the tin-plating film on the surface of the nickel-plating film, is preferably preheated so as not to melt the tin-plating film, before irradiating with the infrared rays. The irradiating with the infrared rays is preferably carried out by means of an infrared lamp. The portion of the surface of the nickel-plating film is preferably apart from the portion of the other portion of the surface of the nickel-plating film.

In the above-described method for producing a plated product, the tin-plating film is preferably formed after the silver-plating film is formed. In this case, a portion other than the portion of the surface of the nickel-plating film is preferably covered with a masking member before the silver-plating film is formed after the nickel-plating film is formed. In addition, a portion other than the portion of the other portion of the surface of the nickel-plating film, and the surface of the silver-plating film are preferably covered with a masking member before the tin-plating film is formed after the silver-plating film is formed.

According to the present invention, there is provided a plated product comprising: a base material of copper or a copper alloy; a nickel-plating layer formed on a surface of the base material; a silver-plating layer formed on a portion of a surface of the nickel-plating layer; and a reflowed tin-plating layer formed on a portion of the other portion of the surface of the nickel-plating layer, wherein the silver-plating layer has a surface which has a contact resistance of not higher than 1 mΩ.

In this plated product, the silver-plating layer, which is formed on the surface of the nickel-plating layer, is preferably apart from the tin-plating layer.

Effects of the Invention

According to the present invention, it is possible to produce an inexpensive plated product, which can prevent the increase of the contact resistance of a silver-plating film and the change of the color of the surface thereof after reflow-treating a plated product wherein the silver-plating film is formed on a portion of the surface thereof and wherein a tin-plating film is formed on a portion of the other portion of the surface thereof.

MODE FOR CARRYING OUT THE INVENTION

Referring to the accompanying drawings, the preferred embodiment of a method for producing a plated product according to the present invention will be described below in detail.

Figure 1A:
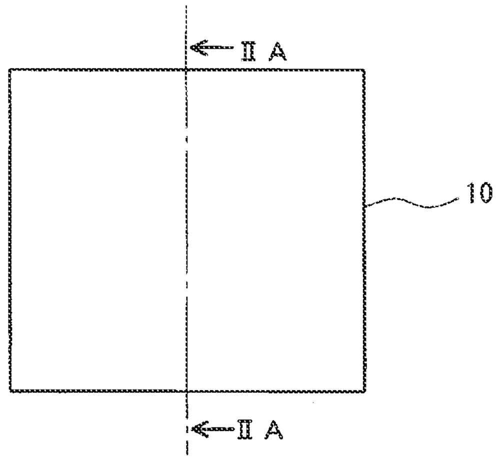
FIG. 1A is a plan view for explaining a step of preparing a base material in the preferred embodiment of a method for producing a plated product according to the present invention.
Figure 2A:
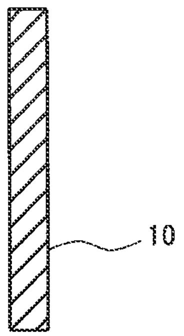
FIG. 2A is a sectional view taken along line IIA-IIA of FIG. 1A.

In the preferred embodiment of a method for producing a plated product according to the present invention, a base material 10 of copper or a copper alloy is first prepared as shown in FIGS. 1A and 2A. As this base material 10, there may be used a base material of pure copper, such as oxygen free copper or tough pitch copper, or a base material of a copper alloy, such as brass, phosphor bronze, Cu—Ni—Si based alloy, Cu—Fe—P based alloy or Cu—Ni—Sn—P based alloy. Although the base material 10 may be a single reed-shaped piece, it is preferably an elongated material, such as a wire, rod, bar or strip material, (capable of being produced by means of a continuous plating line of a reel-to-reel system) from the viewpoint of productivity.

Figure 1B:
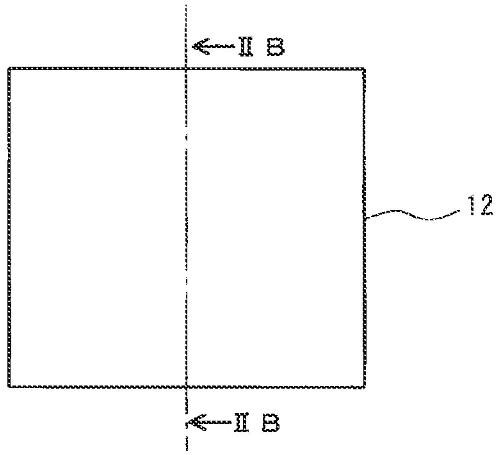
FIG. 1B is a plan view for explaining a step of forming a nickel-plating film in the preferred embodiment of a method for producing a plated product according to the present invention.
Figure 2B:
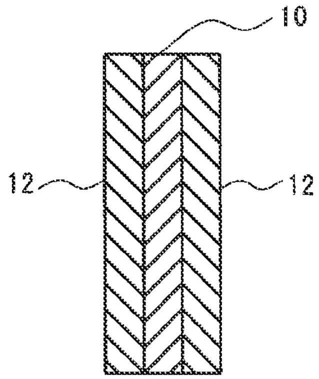
FIG. 2B is a sectional view taken along line IIB-IIB of FIG. 1B.

Then, a nickel-plating film 12 serving as an underlying plating film is formed on each of the substantially entire surfaces (rolled surfaces) of the base material 10 as shown in FIGS. 1B and 2B. Although the nickel-plating film may be formed by any one of electroplating and electroless plating, it is preferably formed by electroplating from the viewpoint of productivity and costs thereof.

Figure 1C:
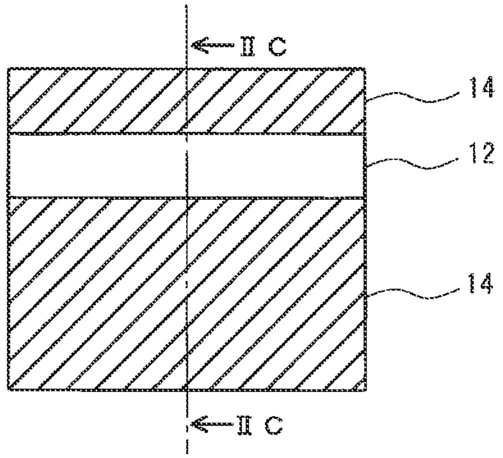
FIG. 1C is a plan view for explaining a step of applying a masking tape on a portion of the nickel-plating film in the preferred embodiment of a method for producing a plated product according to the present invention.
Figure 1D:
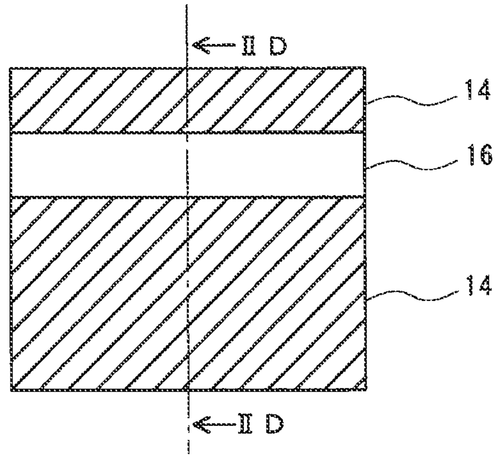
FIG. 1D is a plan view for explaining a step of forming a silver-plating film on a portion, in which the masking tape is not applied, of the nickel-plating film in the preferred embodiment of a method for producing a plated product according to the present invention.
Figure 1E:
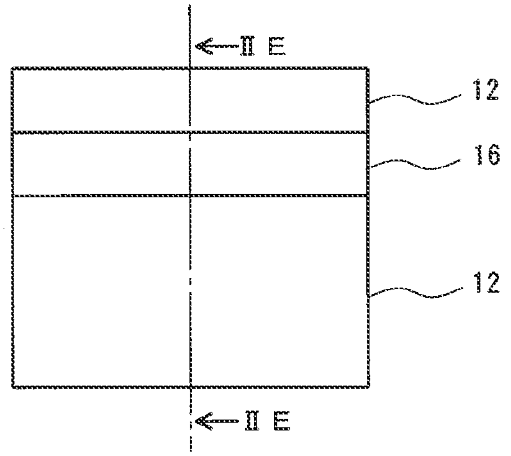
FIG. 1E is a plan view for explaining a step of peeling the masking tape off after forming the silver-plating film in the preferred embodiment of a method for producing a plated product according to the present invention.
Figure 2C:
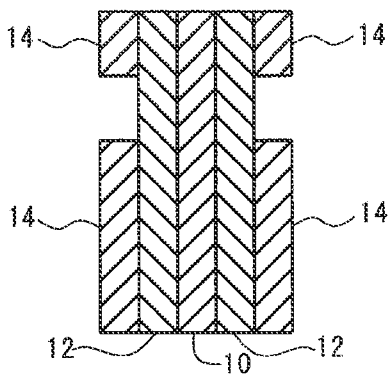
FIG. 2C is a sectional view taken along line IIC-IIC of FIG. 1C.
Figure 2D:
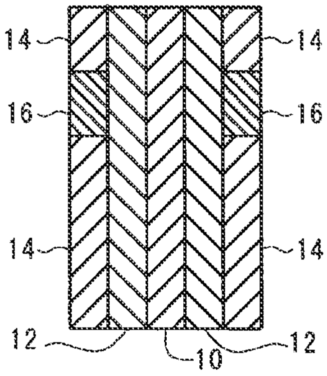
FIG. 2D is a sectional view taken along line IID-IID of FIG. 1D.
Figure 2E:
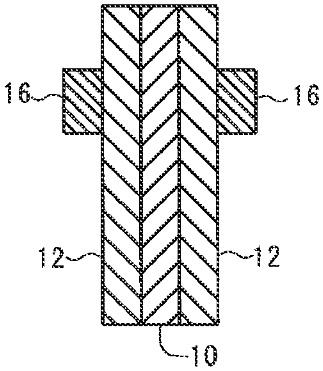
FIG. 2E is a sectional view taken along line IIE-IIE of FIG. 1E.

Then, after a masking member 14 is arranged on each of portions other than a portion of the surface of the nickel-plating film 12 (e.g., a masking tape is applied thereon, or a resist mask is formed thereon) to cover the portions other than the portion of the surface of the nickel-plating film 12 as shown in FIGS. 1C and 2C, a silver-plating film 16 is formed on the portion of the surface of the nickel-plating film 12 (a region in which the masking member 14 is not arranged (a region other than regions shown by diagonal lines in FIGS. 1C and 1D)) as shown in FIGS. 1D and 2D. Thereafter, the mask member 14 is removed (e.g., the masking tape or the resist mask is peeled off) as shown in FIGS. 1E and 2E. The silver-plating film 16 is preferably formed by electroplating.

Figure 1F:
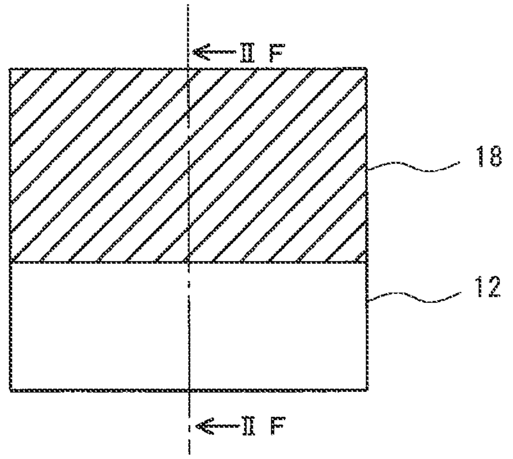
FIG. 1F is a plan view for explaining a step of applying a masking tape on the entire surface of the silver-plating film and on a portion of the nickel-plating film after the step of peeling the masking tape off in the preferred embodiment of a method for producing a plated product according to the present invention.
Figure 1G:
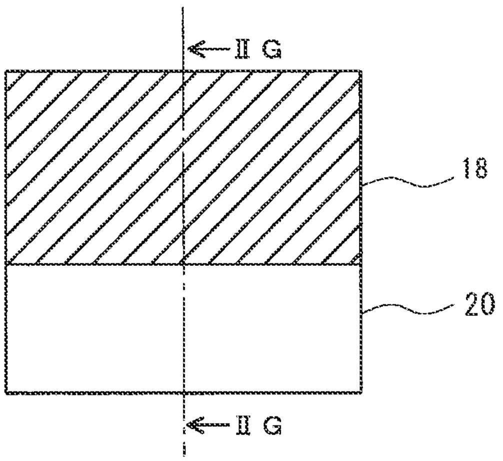
FIG. 1G is a plan view for explaining a step of forming a tin-plating film on a portion, in which the masking tape is not applied, of the nickel-plating film in the preferred embodiment of a method for producing a plated product according to the present invention.
Figure 1H:
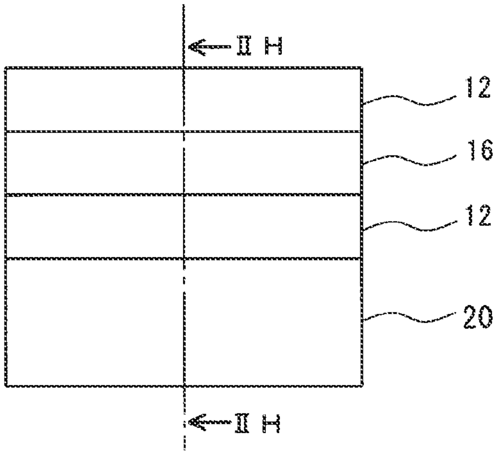
FIG. 1H is a plan view for explaining a step of peeling the masking tape off after forming the tin-plating film in the preferred embodiment of a method for producing a plated product according to the present invention.
Figure 2F:
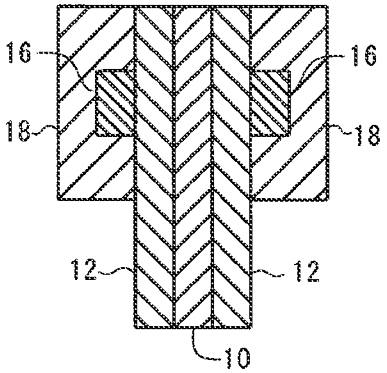
FIG. 2F is a sectional view taken along line IIF-IIF of FIG. 1F.
Figure 2G:
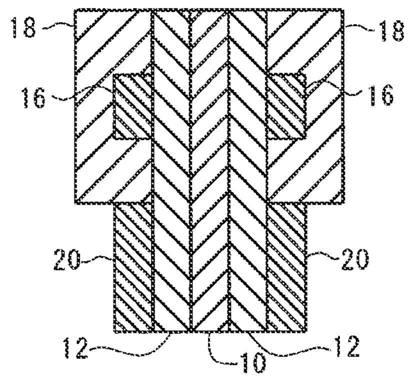
FIG. 2G is a sectional view taken along line IIG-IIG of FIG. 1G.
Figure 2H:
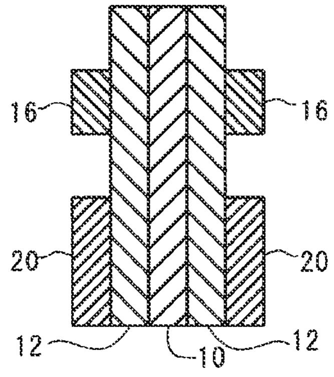
FIG. 2H is a sectional view taken along line IIH-IIH of FIG. 1H.

Then, after a masking member 18 is arranged on each of portions other than a portion of the other portions (i.e., the portions other than the portion) of the surface of the nickel-plating film 12 and on the (entire) surface of the silver-plating film 16 (e.g., a masking tape is applied thereon, or a resist mask is formed thereon) to cover the portions other than the portion of the surface of the nickel-plating film 12 and the (entire) surface of the silver-plating film 16 as shown in FIGS. 1F and 2F, a tin-plating film 20 is formed on a portion of the portions other than the portion of the surface of the nickel-plating film 12 (a region in which the masking member 18 is not arranged (a region other than a region shown by diagonal lines in FIGS. 1F and 1G)) as shown in FIGS. 1G and 2G. Thereafter, the masking member 18 is removed (e.g., the masking tape or the resist mask is peeled off) as shown in FIGS. 1H and 2H. The tin-plating film is preferably formed by electroplating.

Figure 1J:
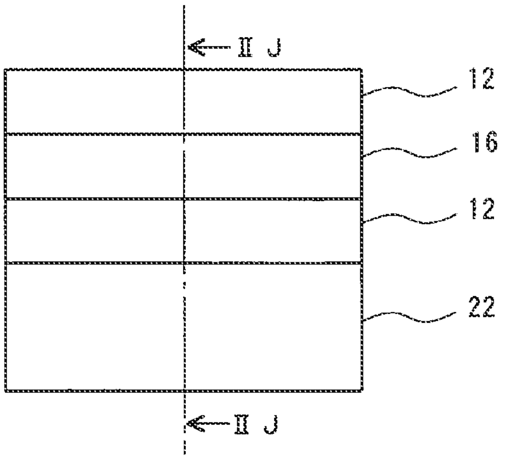
FIG. 1J is a plan view for explaining a step of reflow-treating the tin-plating film after peeling the masking tape off in the preferred embodiment of a method for producing a plated product according to the present invention.
Figure 2J:
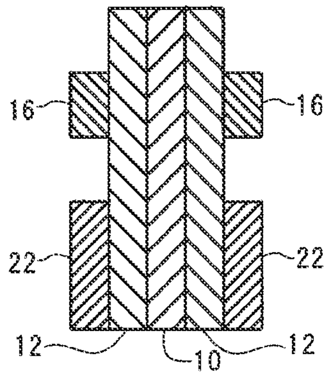
FIG. 2J is a sectional view taken along line IIJ-IIJ of FIG. 1J.

After there is thus prepared a plated product wherein the silver-plating film 16 and the tin-plating film 20 (apart from the silver-plating film 16) are formed on the surface of the nickel-plating film 12 formed on each of the substantially entire surfaces of the base material 10, it is preheated by means of a furnace using a ceramic panel heater or the like, on conditions that the tin-plating film 20 is not melted. Thereafter, the surface of the plated product is irradiated with infrared rays in the atmosphere (by means of an infrared lamp or the like) to be heated to melt the tin-plating film 20, and then, cool (reflow-treat) it to cause the tin-plating film 20 to be a reflowed tin-plating layer 22 as shown in FIGS. 1J and 2J.

Furthermore, the heating by infrared rays is radiation, and silver is difficult to absorb infrared rays, the absorptivity thereof being, e.g., about 0.01 at a wavelength of 1 μm. On the other hand, tin is easy to absorb infrared rays, the absorptivity thereof being, e.g., about 0.25 at a wavelength of 1 μm. For that reason, if the plated product having the silver-plating film 16 and tin-plating film 20 on the surface of the nickel-plating film 12 formed on the substantially entire surface of the base material 10 is irradiated with infrared rays by means of an infrared lamp or the line to be heated, it is considered that the silver-plating film 16 is hardly heated by radiation, and the tin-plating film 20 is selectively heated, so that the tin-plating film 20 is melted, and then, cooled (reflow-treated) to be changed to the reflowed tin-plating film 22. If the reflowed tin-plating film 22 is thus formed, it is considered that the temperature rising of the silver-plating film by heating is suppressed, so that the change of the color of the silver-plating film and the increase of the contact resistance thereof are suppressed. If the plated product is preheated so as not to melt the tin-plating film before the heating by infrared rays is carried out, it is possible to decrease the time heated by infrared rays.

If the base material 10 is an elongated material, such as a wire, rod, bar or strip material, it is preferably continuously plated by means of a continuous plating line of a reel-to-reel system. If a masking tape is used as the masking member 18, the masking tape is preferably continuously applied by means of a continuous tape applying apparatus in the continuous plating line.

By the above-described preferred embodiment of a method for producing a plated product according to the present invention, it is possible to produce the following preferred embodiment of a plated product according to the present invention.

The preferred embodiment of a plated product according to the present invention comprises: a base material 10 of copper or a copper alloy; a nickel-plating layer 12 formed on the substantially entire surface of the base material 10; a silver-plating layer 16 formed on a portion of a surface of the nickel-plating layer 12; and a reflowed tin-plating layer 22 (apart from the silver-plating layer 16) formed on a portion of the other portion of the surface of the nickel-plating layer 12, wherein the surface of the silver-plating layer 16 has a contact resistance of not higher than 1 mΩ.

EXAMPLES

Examples of a plated product and a method for producing the same according to the present invention will be described below in detail.

Example

First, there was prepared a strip material of a Cu—Ni—Sn based alloy (NB109-EH produced by DOWA METAL CO., LTD.) having a thickness of 0.2 mm and a width of 25 mm as a base material (a material to be plated). This base material was installed in a continuous plating line of a reel-to-reel system (for continuously carrying out plating) so that the width directions of the base material are vertical directions.

In this continuous plating line, the base material and a SUS plate were put in an alkaline degreaser to be used as a cathode and an anode, respectively, to electrolytic-degrease the base material at a voltage of 5 V for 30 seconds, and then, the base material was washed with water and pickled for 15 seconds in 3% sulfuric acid, as the pretreatment of the base material.

Then, in the continuous plating line, the pretreated base material and an anode case of titanium housing therein chips of nickel were used as a cathode and an anode, respectively, to electroplate (dull-nickel-plate) the base material at a liquid temperature of 50° C. and a current density of 9 A/dm$^2$ for 30 seconds in an aqueous dull nickel-plating solution containing 540 g/L of nickel sulfamate tetrahydrate, 25 g/L of nickel chloride and 35 g/L of boric acid to form a dull nickel-plating film serving as an underlying plating film on the substantially entire surfaces of both sides of the base material. The thickness of the substantially central portion in width directions of the dull nickel-plating film was measured by means of an X-ray fluorescent analysis thickness meter (SFT-110A produced by Hitachi High-Tech Science Corporation). As a result, the thickness was 0.5 μm.

Then, in the continuous plating line, a masking tape was applied on each of a portion having a width of 13 mm from the lower end portion in width directions and a portion having a width of 4 mm from the upper end portion in width directions, on both sides of the base material (the material to be plated).

Then, in the continuous plating line, the base material having the underlying plating film and a stainless (SUS) plate were used as a cathode and an anode, respectively, to electroplate the base material having the underlying plating film at a room temperature (25° C.) and a current density of 2 A/dm$^2$ for 10 seconds in an aqueous silver strike plating solution containing 3 g/L of silver potassium cyanide and 90 g/L of potassium cyanide, to form a silver strike plating film in a region (a belt-shaped exposed surface), in which the masking tape was not applied, on the base material having the underlying plating film, and then, the silver-strike-plated base material was washed with water to sufficiently wash away the silver strike plating solution.

Then, in the continuous plating line, the base material having the silver strike plating film and an anode case of titanium housing therein silver particles were used as a cathode and an anode, respectively, to electroplate (silver-plate) the material at a liquid temperature of 18° C. and a current density of 8 A/dm$^2$ for 21 seconds in an aqueous silver-plating solution containing 175 g/L of silver potassium cyanide ($KAg(CN)_2$), 95 g/L of potassium cyanide (KCN) and 102 mg/L of potassium selenocyanate (KSeCN), to form a silver-plating film (on the silver strike plating film) on the base material, and then, the silver-plated base material was washed with water to sufficiently wash away the silver-plating solution. The thickness of the substantially central portion in width directions of the silver-plating film was measured by means of an X-ray fluorescent analysis thickness meter (SFT-110A produced by Hitachi High-Tech Science Corporation). As a result, the thickness was 1.0 μm.

Then, in the continuous plating line, the masking tapes were taken off from the underlying plating films on the base material, and then, a masking tape was applied on a portion having a width of 15 mm from the upper end portion in width directions of the base material (on a belt-shaped portion covering the entire surface of the silver-plating film and a portion of the underlying plating film).

Then, in the continuous plating line, the base material having the silver-plating film and an anode case of titanium housing therein balls of tin were used as a cathode and an anode, respectively, to electroplate (tin-plate) the material at a liquid temperature of 25° C. and a current density of 12 A/dm$^2$ for 14 seconds in a tin-plating solution containing 250 mL/L of tin alkanolsulfonate (METASU SM-2 produced by Yuken Industry Co., Ltd.) (serving as metallic tin salts) and 75 mL/L of alkanolsulfonate (METASU AM produced by Yuken Industry Co., Ltd.) (serving as free acids), to form a tin-plating film having a thickness of 1 μm in a region (an exposed surface of the underlying plating film on the base material (a region having a width of 10 mm from the lower end portion in width directions of the material to be plated)), in which the masking tape was not applied, on the base material having the silver-plating film, and then, the masking tape was taken off.

Then, the base material having the tin-plating film was put in a furnace using a ceramic panel heater and preheated therein (the tin-plating film was not melted in this preheating), and then, placed to face a flat plate-shaped radiating type infrared lamp (Ps110VP produced by Advance Riko, Inc., single-phase 200 V, 2 kW) to be heated for 15 seconds at an output of 67% to carry out a reflow treatment. By this reflow treatment, the tin-plating layer was solidified after being melted, so that it was confirmed that a reflowed tin-plating layer was formed.

With respect to a plated product thus produced, the contact resistance of the surface of the silver-plating layer was measured at a load of 100 gf by means of an electric contact simulator (CRS-1 produced by Yamasaki Seiki Laboratory Co., Ltd.) before and after the reflow treatment. As a result, the contact resistance was 0.72 m before the reflow treatment, and 0.64 m after the reflow treatment, so that the contact resistance was not increased. In addition, the appearance of the silver-plating layer was observed with the naked eye. As a result, the change of the color of the silver-plating layer was not confirmed before and after the reflow treatment.

Comparative Example

A plated product was produced by the same method as that in Example, except that the base material having the tin-plating film was arranged on a hot plate (HIGH TEMP HOTPLATE (Model HTH-500N) produced by AS ONE Corporation) to be heated at 450° C. in the atmosphere, in place of the heating by means of the flat plate-shaped radiating type infrared lamp after preheating.

With respect to a plated product thus produced, the contact resistance of the surface of the silver-plating layer was measured by the same method as that in Example before and after the reflow treatment. As a result, the contact resistance was 0.75 m before the reflow treatment, and 2.49 m after the reflow treatment, so that the contact resistance was greatly increased. In addition, the appearance of the silver-plating layer was observed with the naked eye. As a result, the change of the color of the silver-plating layer was confirmed before and after the reflow treatment.

DESCRIPTION OF REFERENCE NUMBERS

10 Base Material
12 Underlying Plating Film (Nickel-Plating Film)
14 Masking Member
16 Silver-Plating Film
18 Masking Member
20 Tin-Plating Film
22 Reflowed Tin-Plating Film

The invention claimed is:

1. A plated product comprising:
a base material of copper or a copper alloy;
a nickel-plating layer formed on a surface of the base material;
a silver-plating layer formed on a portion of a single major side of a surface of the nickel-plating layer; and
a reflowed tin-plating layer formed on another portion of the single major side of the surface of the nickel-plating layer,
wherein the silver-plating layer has a surface which has a contact resistance of not higher than 1 mΩ.

2. A plated product as set forth in claim 1, wherein the silver-plating layer, which is formed on the single major side of the surface of the nickel-plating layer, is apart from the reflowed tin-plating layer.

3. A contact or terminal part using the plating product as set forth in claim 1, as a material thereof.

4. A plated product as set forth in claim 1, wherein said silver-plating layer is apart from said reflowed tin-plating layer.

* * * * *